(12) United States Patent
Sasage et al.

(10) Patent No.: US 7,571,291 B2
(45) Date of Patent: Aug. 4, 2009

(54) INFORMATION PROCESSING SYSTEM, PRIMARY STORAGE DEVICE, AND COMPUTER READABLE RECORDING MEDIUM RECORDED THEREON LOGICAL VOLUME RESTORING PROGRAM

(75) Inventors: Koutarou Sasage, Kawasaki (JP); Yusuke Inai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 423 days.

(21) Appl. No.: 11/126,165

(22) Filed: May 11, 2005

(65) Prior Publication Data
US 2006/0149901 A1 Jul. 6, 2006

(30) Foreign Application Priority Data
Jan. 5, 2005 (JP) ............................. 2005-000855

(51) Int. Cl.
G06F 12/10 (2006.01)
G06F 12/08 (2006.01)
(52) U.S. Cl. ........................................ 711/162; 711/122
(58) Field of Classification Search .................. 711/162
See application file for complete search history.

(56) References Cited

U.S. PATENT DOCUMENTS

| 5,271,012 A | 12/1993 | Blaum et al. |
| 5,351,246 A | 9/1994 | Blaum et al. |
| 5,579,475 A | 11/1996 | Blaum et al. |
| 5,611,069 A | 3/1997 | Matoba |
| 5,644,695 A | 7/1997 | Blaum et al. |
| 7,055,059 B2 * | 5/2006 | Yanai et al. ..................... 714/7 |

FOREIGN PATENT DOCUMENTS

| JP | 7-28710 | 1/1995 |
| JP | 7-129331 | 5/1996 |
| JP | 9-114737 | 5/1997 |
| JP | 2002-157093 | 5/2002 |
| JP | 2003-085019 | 3/2003 |
| JP | 2003-316525 | 11/2003 |
| JP | 2004-171373 | 6/2004 |

OTHER PUBLICATIONS

Japanese Notice of Reason for Refusal issued Mar. 30, 2009 in corresponding Japanese Application No. 2005-000855.

* cited by examiner

Primary Examiner—Hyung S Sough
Assistant Examiner—Hamdy S Ahmed
(74) Attorney, Agent, or Firm—Staas & Halsey LLP

(57) ABSTRACT

In a hierarchical storage system, a primary storage device interposed between a secondary storage device and a data processing apparatus has a restoring unit. When at least two current storage units, which configure a logical volume and are in the mirroring relationship, concurrently fail, the restoring unit reads out data recorded in a logical volume of the current storage units from a virtual logical volume of the secondary storage device, records the data on the at least two spare storage units, thereby restoring, on the spare storage units, the logical volume of the current storage units. Even when a plurality of storages configuring a logical volume and being in the mirroring relationship concurrently fail, it is possible to immediately restore the logical volume without the maintenance operation or the like.

14 Claims, 7 Drawing Sheets

INFORMATION PROCESSING SYSTEM, PRIMARY STORAGE DEVICE, AND COMPUTER READABLE RECORDING MEDIUM RECORDED THEREON LOGICAL VOLUME RESTORING PROGRAM

BACKGROUND OF THE INVENTION

1) Field of the Invention

The present invention relates to a technique for recovering from data loss when storage media fail in a hierarchical storage system in which a plurality of storage devices is combined.

2) Description of the Related Art

There has been a technique that the same data is written on the pair of disks as done in a RAID (Redundant Arrays of Inexpensive Disk) system to make the pair of disks be in a mirroring relationship, whereby data on one of the disks can be restored on the basis of data on the other disk when one of the disks fails.

However, such technique has a problem that when the pair of disks in the mirroring relationship both fail, the data cannot be restored, hence the data is lost.

For the above reason, there has been proposed a technique as follows (see Japanese Patent Application Laid-Open No. 2003-316525). Namely, besides the pair of storage units (the first and second storage units) in the mirroring relationship, the third storage unit is written thereon the same data as that on the pair of storage units, as well. When a fault (failure) occurs in the first storage unit, the second and third storage units configure a disk array of RAID 1. When a fault also occurs in the second storage unit, the data is kept by the third storage unit, whereby the fault (failure) tolerance is improved.

Meanwhile, there is a hierarchical storage system, using a characteristic that data accessed by the host computer (data processing apparatus) is classified into data having high access frequency and data having low access frequency. As shown in FIG. 7, the hierarchical storage system adopts a data hierarchical structure in which the data having high access frequency is recorded on an expensive primary storage device having high performance but small capacity located closer to the host computer, whereas the data having low access frequency is recorded on an inexpensive secondary storage device having low performance but large capacity located farther from the host computer.

In such hierarchical storage system, there is used a library apparatus configured by accommodating a plurality of recording media such as magnetic tapes, optical disks or the like as the secondary storage device. This hierarchical storage system has a function called a virtual disk mechanism which allows the host computer to virtually regard a storage area having a large capacity formed by the recording media in the library apparatus as a disk space, thereby providing, to the host computer, a disk space larger than the physical disk possessed by the primary storage device.

Meanwhile, a logical disk space of all storage areas on the secondary storage device represented to the host computer by means of the virtual disk mechanism is referred to as a virtual logical volume (VLU: Virtual Logical Unit). To the contrary, a logical disk space configured by a physical disk of the primary storage device is referred to as a logical volume (OLU: Open system Logical Unit). The user can voluntarily set the capacities and the numbers of the virtual logical volumes and the logical volumes.

In the primary storage device of the hierarchical storage system having the virtual disk mechanism described above with reference to FIG. 7, a plurality of physical disks are in the mirroring relationship. When one of the plural physical disks fails, it is possible to keep data by another physical disk.

However, when the plural physical disks in the mirroring relationship concurrently fail, the data cannot be kept. The maintenance operation such as replacement of the physical disks or the like is required to use again the logical volume on the failed physical disks. Hence, it is impossible to use the logical volume, immediately.

To use again the logical volume on the failed logical disks, it is necessary to read the data from the secondary storage device onto the physical disks after the replacement of the logical disks. However, it takes a long time to perform the operation of reading the data from the secondary storage device. A reason of this is that it is necessary to perform steps of taking out a recording medium (magnetic tape, optical disk or the like) holding the data from a shelf storing a plurality of recording media by an accessor, conveying the storage medium and inserting it to a drive unit to access to the recording medium, and reading out the data from the recording medium by the drive unit, in order to read the data from the secondary storage device (library apparatus).

SUMMARY OF THE INVENTION

In the light of the above problems, an object of the present invention is to immediately restore a logical volume configured by a plurality of storages without a maintenance operation or the like even when the plural storages (recording media) configuring the logical volume and being in the mirroring relationship concurrently fail in a hierarchical storage system.

The present invention therefore provides an information processing system comprising a secondary storage device for retaining a recording medium configuring a virtual logical volume, a data processing apparatus for processing data recorded in the virtual logical volume of the secondary storage device, a primary storage device interposed between the secondary storage device and the data processing apparatus, the primary storage device comprising at least two current storage units configuring a logical volume in which data read out from the virtual logical volume of the secondary storage device in order that the data processing apparatus has an access to the data to process the same is recorded, and being in a mirroring relationship, at least two spare storage units which can be used in the mirroring relationship, and a restoring unit for, when the at least two current storage units concurrently fail, reading out data recorded in the logical volume of the current storage units from the virtual logical volume of the secondary storage device, recording the data on the at least two spare storage units, thereby restoring, on the at least two spare storage units, the logical volume of the at least two current storage units.

It is preferable that the information processing system further comprising a mapping table showing a relationship between data recorded in the logical volume of the current storage units and data recorded in the virtual logical volume of the recording medium, the restoring unit restoring, on the spare storage units, the logical volume on the basis of the relationship held in the mapping table.

It is preferable that the secondary storage device has a plurality of virtual logical volumes, the primary storage device has a plurality of logical volumes, and the information processing apparatus further comprises a hierarchy controlling unit for recording, over the plural logical volumes, data in the same virtual logical volume.

It is preferable that, when data in the same virtual logical volume cannot be recorded on one logical volume because the logical volume lacks a capacity thereof, the hierarchy controlling unit records, on another logical volume differing from the logical volume, the data in the virtual logical volume. It is also preferable that, in the case where data in the same virtual logical volume is recorded over a plurality of logical volumes, when a part of the data is read out from one logical volume among the plural logical volumes, so that the data in the same virtual logical volume gets to be able to be recorded on the one logical volume, the hierarchy controlling unit records, on the one logical volume, the data.

The present invention further provides a primary storage device interposed between a secondary storage device retaining a recording medium configuring a virtual logical volume and a data processing apparatus processing data recorded in the virtual logical volume of the secondary storage device, the primary storage device comprising at least two current storage units configuring a logical volume in which data read out from the virtual logical volume of the secondary storage device in order that the data processing apparatus has an access to the data to process the same is recorded, and being in a mirroring relationship, at least two spare storage units which can be used in the mirroring relationship, and a restoring unit for, when the at least two current storage units concurrently fail, reading out data recorded in the logical volume of the current storage units from the virtual logical volume of the secondary storage device, recording the data on the at least two spare storage units, thereby restoring, on the at least two spare storage units, the logical volume of the at least two current storage units.

According to this invention, even when two or more current storage units in the mirroring relationship concurrently fail, the restoring unit can restore data recorded in a logical volume of the current storage units, thereby to restore, on spare storage units, the logical volume of the current storage units, with the two or more spare storage units, which can be used in the mirroring relationship. It is thus possible to guarantee data recorded on the two or more current storage unit, and immediately restore the logical volume without a maintenance operation such as replacement, repair or the like of the storage units.

At this time, the restoring unit restores the logical volume on the basis of the mapping table. When data recorded in a logical volume of the current storage units and data recorded in a virtual logical volume of the secondary storage device coincide with each other at the time of occurrence of the fault in the current storage units, it is possible to restore the data recorded in the logical volume. Even when the data recorded in the logical volume and the data recorded in the virtual logical volume do not coincide, it is possible to restore the data on the basis of the mapping table.

The hierarchy controlling unit records data of the same virtual logical volume in one logical volume as much as possible. Even when the current storage units fail, it is possible to suppress the damage of it to the minimum because the number of virtual logical volumes affected by this is only one. When the restoring unit reads out data from a recording media of the secondary storage device, the restoring unit has to read out data from only one recording medium, which can largely shorten the restoration time as compared with a case where the data is read out from plural recording media, and can immediately restore, on the spare storage units, the logical volume.

DESCRIPTION OF THE PREFERRED EMBODIMENTS

Now, description will be made of an embodiment of the present invention with reference to the drawings.

[1] Embodiment of the Invention

First, a structure of an information processing system (hierarchical storage system) 100 as being an embodiment of this invention will be described with reference to a block diagram shown in FIG. 1.

Figure 1:
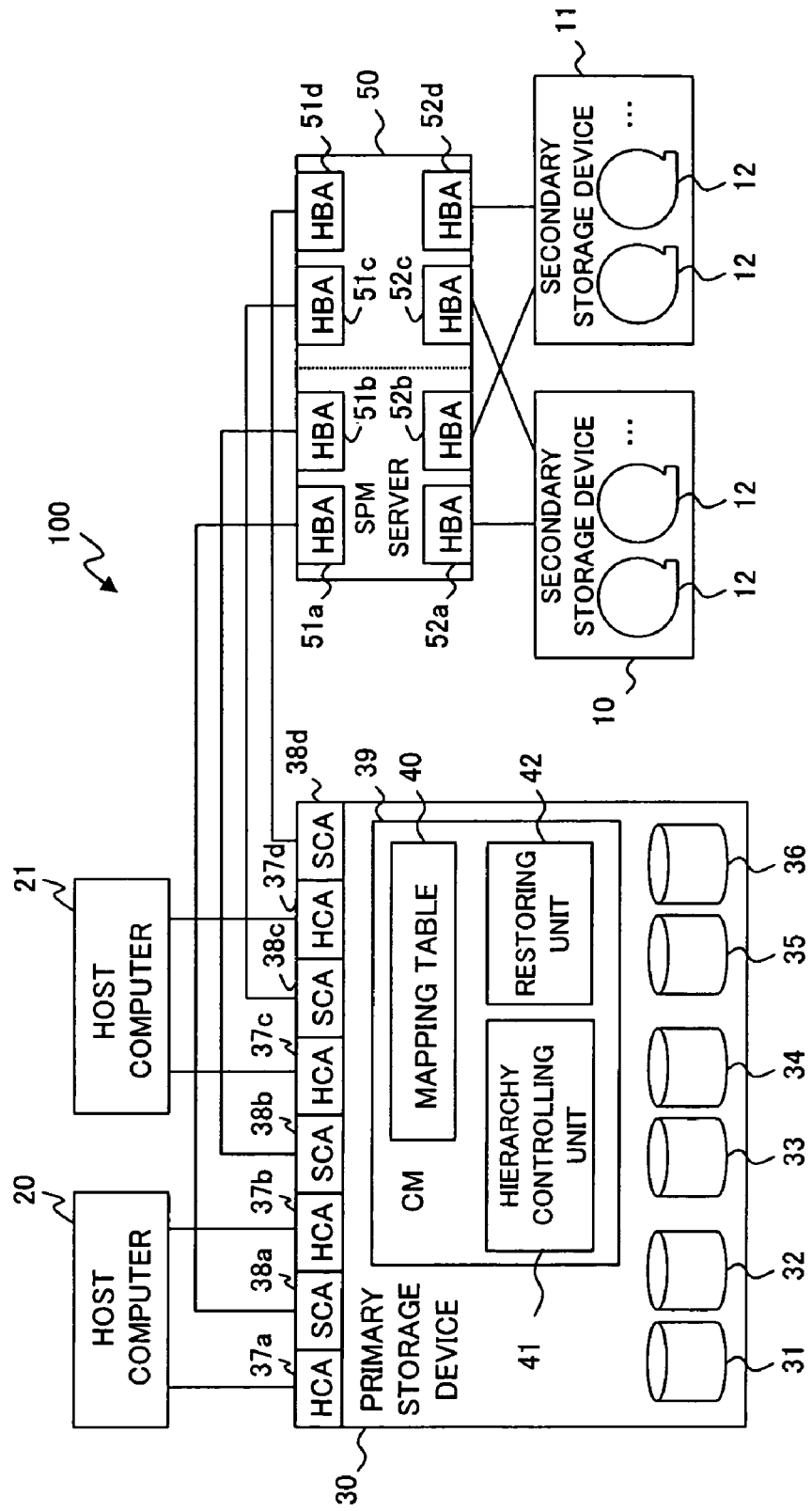
FIG. 1 is a block diagram showing a structure of an information processing system according to an embodiment of this invention.

As shown in FIG. 1, the information processing system 100 comprises secondary storage devices 10 and 11, host computers (data processors) 20 and 21, a primary storage device 30 and a SPM (Storage Pyramid Management) server 50.

The secondary storage devices 10 and 11 are a library apparatus having a plurality of recording media 12 such as magnetic tapes, optical disks or the like. The plural recording media 12 configure a plurality of virtual logical volumes (VLUs: Virtual Logical Units), in which data to be processed by the host computers 20 and 21 is held. Incidentally, the capacities, the number and the like of the virtual logical volumes configured by the plural recording media 12 can be voluntarily set by the operator of the information processing system 100.

Each of the secondary storage devices 10 and 11 is equipped with a shelf (not shown) for accommodating a plurality of the storage media 12, a drive unit (not shown) for accessing to the storage media 12, and an accessor (not shown) for conveying the recording medium 12 accommodated on the shelf to the drive unit. When the data held in the recording medium 12 is accessed, it takes a long time to read the data from the recording medium 12 because it is necessary to control the accessor, and convey the recording medium 12 holding the data from the shelf to the drive unit.

The host computers 20 and 21 process data recorded in a plurality of virtual logical volumes configured by the plural recording media 12 of the secondary storage devices 10 and 11. Each of the host computers 20 and 21 is connected to the primary storage device 30 to issue access requests (I/O requests such as read request, write request and the like) to the primary storage device 30.

The primary storage device 30 is a disk array apparatus, which is interposed between the secondary storage devices 10 and 11, and the host computers 20 and 21, is accessible at higher speed than the recording media 12 of the secondary storage devices 10 and 11. the primary storage device 30 comprises a plurality (six, here) of magnetic disks (storages) 31 through 36 configuring logical volumes (OLUs: Open system Logical Units) in which data read out from the virtual logical volumes of the secondary storage devices 10 and 11 in order that the host computers 20 and 21 access thereto can be recorded. The capacities and the number of the logical volumes configured by the magnetic disks 31 through 36 can be arbitrarily set by the operator of the information processing apparatus 100. Here is so set that each of the magnetic disks configures one logical volume.

The magnetic disks 31 and 32 are current storage units in the mirroring relationship. The magnetic disk 32 is a duplication of the magnetic disk 31 for the purpose of redundancy. The magnetic disks 33 and 34 are also current storage units in the mirroring relationship. The magnetic disk 34 is a duplication of the magnetic disk 33 for the purpose of redundancy, as well. The magnetic disks (hereinafter, referred to as simply current storage units) 31 through 34 as being the current storage units are recorded thereon data read out from the virtual logical volumes of the secondary storage devices 10 and 11 in order that the host computers 20 and 21 access the data to process the same.

On the other hand, the magnetic disks 35 and 36 are a pair of spare storage units not holding data, which can be used in the mirroring relationship.

The primary storage 30 comprises HCAs (Host Channel Adapters) 37a through 37d, SCAs (SPM Channel Adapters) 38a through 38d, and a cache manager (denoted as CM in the drawing) 39.

The HCAS 37a through 37d are interfaces with the host computers 20 and 21. The HCAs 37a and 37b are connected to the host computer 20 through buses, whereas the HCAs 37c and 37d are connected to the host computer 21 through buses.

The SCAs 38a through 38d are interposed between the primary storage device 30 and the secondary storage devices 10 and 11 to interface with the SPM server 50 which controls data transfer between the primary storage 30 and the secondary storages 10 and 11. The SCA 38a is connected to a HBA (Host Bus Adapter) 51a in the SPM server 50, which is an interface with the primary storage 30, through a bus, the SCA 38b to a HBA 51b through a bus, the SCA 38c to a HBA 51c through a bus, and the SCA 38d to a HBA 51d through a bus.

The SPM server 50 comprises the HBAs 52a through 52d which are interfaces with the secondary storage devices 10 and 11. The HBAs 52a and 52c are connected to the secondary storage device 10, whereas the HBAs 52b and 52d are connected to the secondary storage device 11.

As above, by making each of the connection path between the host computers 20 and 21, and the primary storage device 30, the connection path between the primary storage device 30 and the SPM server 50, and the connection path between the SPM server 50 and the secondary storage devices 10 and 11 redundant, it is possible to secure a communication path even when a fault occurs in one path, whereby the fault tolerance (availability) can be realized.

In response to an access request from the host computer 20 or 21, the primary storage device 30 reads out necessary data, that is, data which is an object of processing responsive to the access request, from the recording medium 12 of the secondary storage devices 10 and 11 through the SPM server 50, and records the data on the current storage 31, 32, . . . or 34. The host computers 20 and 21 have accesses to only the primary storage device 30.

Namely, the entity of a logical volume recognized by the host computers 20 and 21 is a virtual logical volume on the recording medium 12 in the secondary storage devices 10 and 11. The logical volume on the current storage units 31 through 34 in the primary storage device 30 is virtually allocated in order to let the host computers 20 and 21 recognize the virtual logical volume.

Whereby, the host computers 20 and 21 can have an access to the virtual volume of the secondary storage devices 10 and 11 having a capacity larger than the logical volume of the primary storage device 30, while using high response performance of the primary storage device 30.

The cache manager 39 controls an exchange of data between the primary storage device 30 and the secondary storage device 10 or 11 performed through the SPM server 50 in response to an access request from the host computer 20 or 21. The cache manager 39 comprises a mapping table 40, a hierarchy controlling unit 41 and a restoring unit 42.

The mapping table 40 shows a relationship between data recorded in a logical volume of the current storage units 31 through 34 and data recorded in a virtual logical volume of the secondary storage devices 10 and 11. With respect to data recorded in a logical volume of the current storage units 31 through 34, the mapping table 40 holds a capacity of the data, an address on the logical volume of the data, and an address on a virtual logical volume (recording medium 12) of the data.

The hierarchy controlling unit 41 regularly allocates a logical volume formed on the current storage units 31 through 34 in the primary storage device 30 to data when storing the data in the primary storage device 30 in response to an access request from the host computer 20 or 21. In concrete, the hierarchy controlling unit 41 records, in a plurality of logical volumes of the primary storage device 30, data in the same virtual logical volume.

Figure 2:
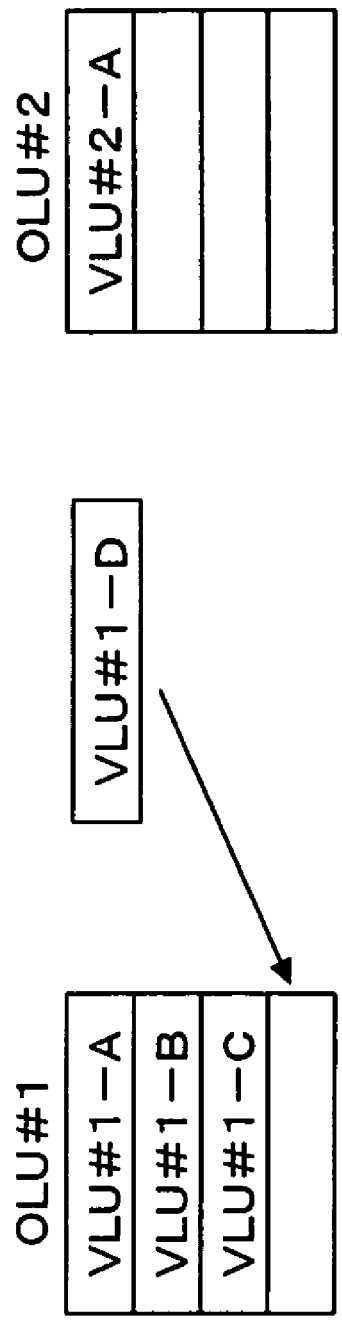
FIG. 2 is a diagram for illustrating an operation of a hierarchy controlling unit of the information processing system according to the embodiment of this invention.

Now, a method of allocating logical volumes of the current storage units 31 through 34 to data by the hierarchy controlling unit 41 will be described with reference to FIGS. 2 through 4. In FIGS. 2 through 4, a logical volume (denoted as OLU in the drawings) #1 is a logical volume configured by the current storage units 31 and 32, and a logical volume (denoted as OLU in the drawings) #2 is a logical volume configured by the current storage units 33 and 34.

As shown in FIG. 2, the hierarchy controlling unit 41 records data of a virtual logical volume #1 in only the logical volume #1, while recording data of a virtual logical volume #2 in only the logical volume #2. Accordingly, when newly recording data VLU#1-D of the virtual logical volume #1 in a logical volume in response to an access request from the host computer 20 or 21, the hierarchy controlling unit 41 records the data VLU#1-D in the logical volume #1, as shown in FIG. 2.

Figures 3A, 3B:
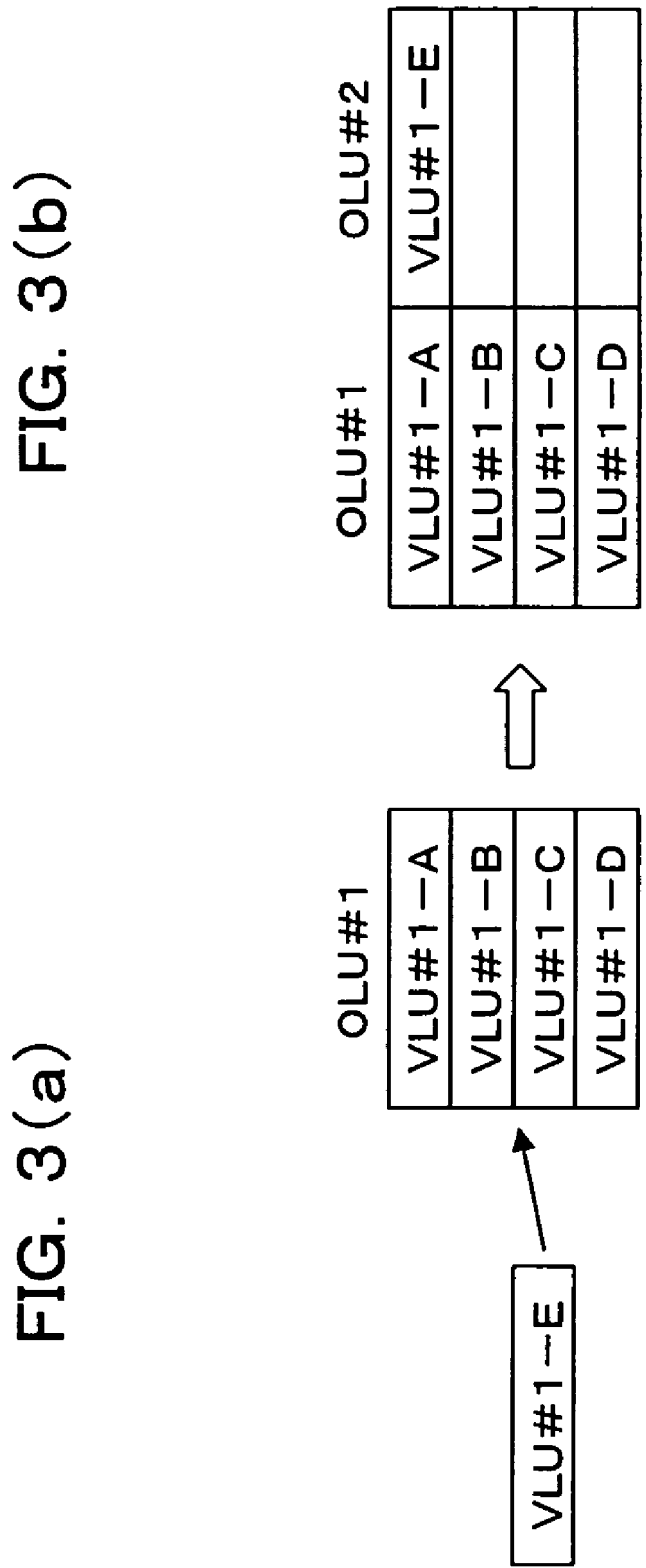
FIGS. 3($a$) and 3($b$) are diagrams for illustrating an operation of the hierarchy controlling unit of the information processing system according to the embodiment of this invention.

As above, the hierarchy controlling unit 41 allocates the same logical volume to data of the same virtual logical volume. When it becomes impossible to record data VLU#1-E of the same virtual logical volume #1 in the logical volume #1 because the logical volume #1 lacks its capacity as shown in FIG. 3(a), the hierarchy controlling unit 41 allocates another logical volume #2 differing from the logical volume #1 to the data VLU#1-E of the virtual logical volume #1, as shown in FIG. 3(b). Namely, when the total capacity of data of the same virtual logical volume to be recorded in one logical volume exceeds the capacity of one logical volume, the hierarchy controlling unit 41 allocates a plurality of logical volumes (here, logical volumes #1 and #2) for the virtual logical volume #1.

When there is no empty logical volume as shown in FIGS. 3(a) and 3(b), the hierarchy controlling unit 41 allocates another logical volume, in which data of another virtual logical volume is recorded, to the data.

When it becomes impossible to allocate the same logical volume to data of the same virtual logical volume as above, the hierarchy controlling unit 41 switches a flag relating to the data of the same virtual logical volume to ON in the mapping table 40, which indicates that data of the same virtual logical volume is recorded over a plurality of logical volumes.

The hierarchy controlling unit 41 periodically dumps data not accessed (updated, referred) from the host computers 20 and 21 for a predetermined period of time, among data of the virtual logical volume in a logical volume, to a recording medium 12 configuring the virtual logical volume. When the capacity of all logical volumes of the primary storage device 30 is short even if data is periodically dumped on the basis of the access frequency as above, the hierarchy controlling unit 41 dumps data whose latest access date/time is the oldest to the secondary storage devices 10 and 11 in order, without overwriting on the data in the logical volume. Whereby, the empty capacity of the logical volume can be secured, and data of the virtual logical volume can be newly recorded.

When all data of one virtual logical volume recorded over a plurality of logical volumes becomes recordable in the same logical volume by dumping data on the basis of the above normal access frequency or the latest access date/time, the hierarchy controlling unit 41 records the data of the virtual logical volume in the same logical volume. Whenever the hierarchy controlling unit 41 secures the empty capacity of a logical volume, the hierarchy controlling unit 41 determines, on the basis of the above flag in the mapping table 40, whether or not the scattering of data of the same virtual logical volume over a plurality of logical volumes can be cancelled.

Figures 4A, 4B:
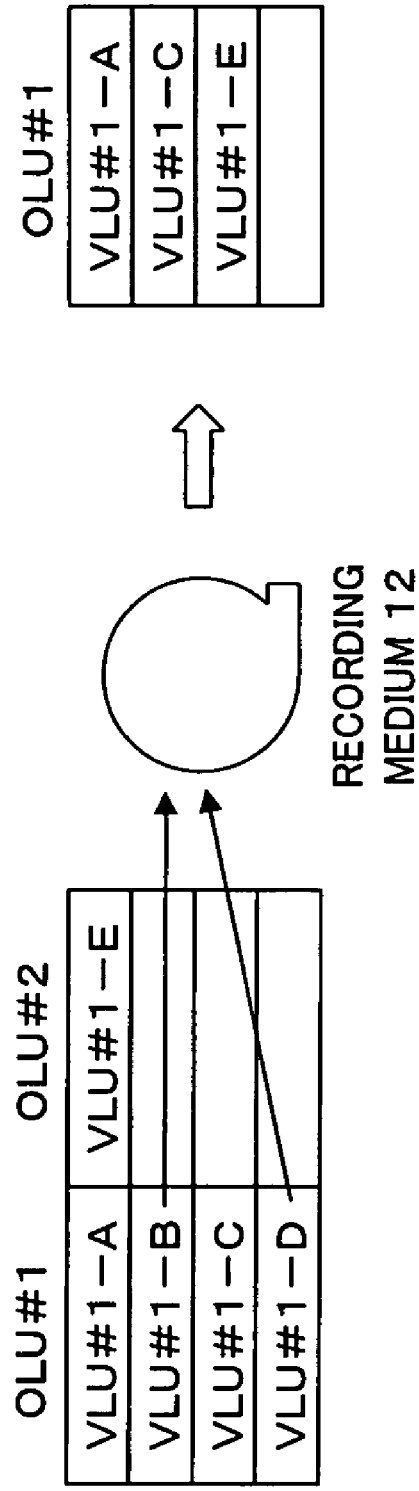
FIGS. 4($a$) and 4($b$) are diagrams for illustrating an operation of the hierarchy controlling unit of the information processing system according to the embodiment of this invention.

Assuming here that a plurality of data VLU#1-A through -E of the virtual logical volume #1 are recorded over a plurality of logical volumes #1 and #2. When the data of VLU #1-B and -D among the plural data VLU#1-A through -E are dumped to the recording medium 12 configuring the virtual logical volume #1, and the logical volume #1 thereby gets to be able to record the data VLU #1-A, -C and -E therein as shown in FIG. 4 (a), the hierarchy controlling unit 41 records the data VLU#1-A, -C and -E in the logical volume #1, as shown in FIG. 4(b).

At this time, the hierarchy controlling unit 41 switches the above flag in the mapping table 40 to OFF, which represents that data of the virtual logical volume #1 is scattered over a plurality of logical volumes.

In the case where data of the same virtual logical volume is recorded over a plurality of logical volumes, when a part of the data is read out from one of the plural logical volumes and the data thereby gets to be able to be recorded in the one logical volume, the hierarchy controlling unit 41 records the data in the same one logical volume, as above.

When the current storage units 31 and 32 or the current storage units 33 and 34 in the mirroring relationship fail concurrently, the restoring unit 42 reads out data recorded in a logical volume of the current storage units 31 and 32 or the current storage units 33 and 34 from a virtual logical volume of the secondary storage devices 10 and 11 on the basis of the relationship in the mapping table 40, and records the data on the spare storage units 35 and 36, which can be used in the mirroring relationship, thereby restoring, on the spare storage units 35 and 36, the logical volume of the current storage units 31 and 32 or the current storage units 33 and 34.

Now, an example of a method of restoring a logical volume by the restoring unit 42 will be described with reference to FIGS. 5 and 6. Incidentally, FIGS. 5 and 6 show only the recording media 12 in the secondary storage devices 10 and 11, the host computer 20, and the current storage units 31 and 32, and the spare storage units 35 and 36 and the restoring unit 42 in the primary storage device 30 in the information processing system 100 shown in FIG. 1, for the sake of simplicity of the drawings.

Figure 5:
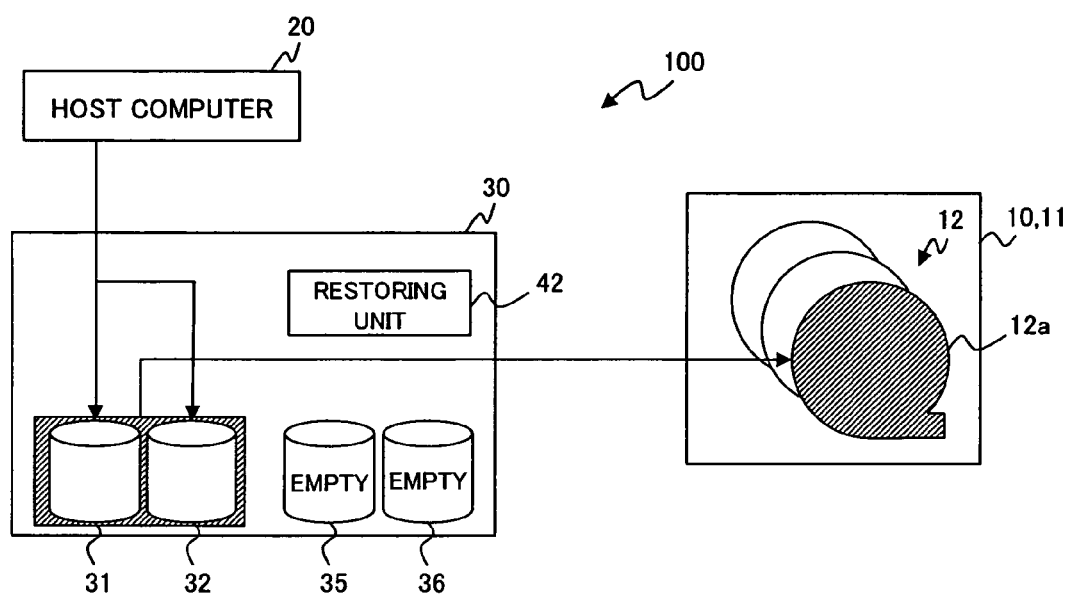
FIG. 5 is a diagram for illustrating an example of an operation of the information processing system according to the embodiment of this invention.

In the information processing system 100, when the host computer 20 makes a request (write request) to write data onto the primary storage device 30, the primary storage device 30 writes the data on a logical volume of the current storage unit 31, and concurrently writes the data on a logical volume of the current storage unit 32, as well, as shown in FIG. 5. Thereafter, the data recorded in the logical volume of the current storage unit 31 is transferred to a recording medium 12 (here, the recording medium 12a) of the secondary storage devices 10 and 11, and written into a virtual logical volume.

When the host computer 20 further makes a request (read request) to read the data thereafter, the data is read out to the logical volume of the current storage unit 31, and transferred to the host computer 20.

Figure 6:
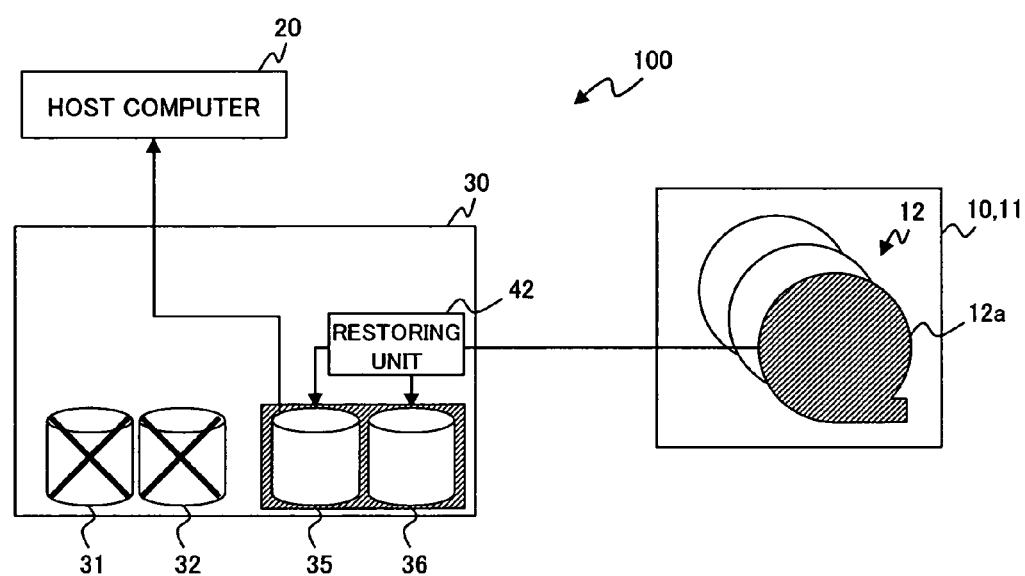
FIG. 6 is a diagram for illustrating an example of an operation of a restoring unit of the information processing system according to the embodiment of this invention.
Figure 7:
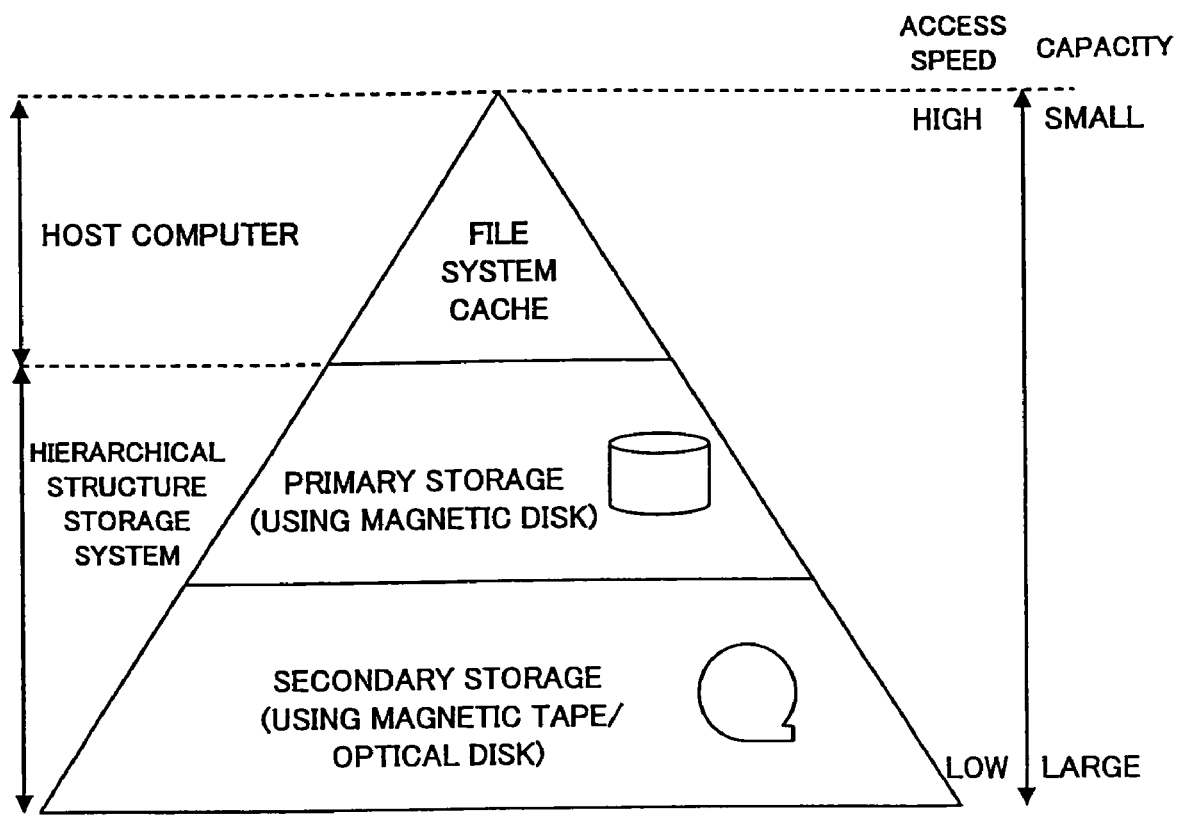
FIG. 7 is a diagram for illustrating a known hierarchical storage system.

When the current storage units 31 and 32 concurrently fail as shown in FIG. 6, the restoring unit 42 assigns the spare storage units 35 and 36 as the logical volume instead the failed current storage units 31 and 32, and restores, on the spare storage units 35 and 36, data held on the current storage unit 31 and 32 which is on the recording medium 12a of the secondary storage devices 10 and 11, thereby transferring the normal data to the host computer 20.

The above data transfer from the primary storage device 30 to the secondary storage devices 10 and 11 in response to a write request from the host computer 20 (or the host computer 21) may be performed in synchronism with the write request from the host computer 20 or 21, or may be performed asynchronously. When the data transfer is performed asynchronously, the response performance to the host computer 20 or 21 is improved because the response does not wait for the data transfer to the secondary storage devices 10 and 11, but a state where the data in the primary storage device 30 and the data in the secondary storage devices 10 and 11 do not coincide generates. When the current storage units 31 and 32, or the current storage units 33 and 34 both concurrently fail in such state, the latest data (that is, data held on the current storage units at the time of occurrence of the fault) cannot be restored by the restoring unit 42. Accordingly, the more frequently the data transfer to the secondary storage devices 10 and 11, the higher is the possibility that the latest data can be restored.

Even when the current storage units 31 and 32, or the current storage units 33 and 34 both fail concurrently in such state, the restoring unit 42 can restore the data at a point of the past.

According to the information processing system 100 of the embodiment of this invention, even when the plural current storage units 31 and 32, or storage units 33 and 34, which configure a logical volume and are in the mirroring relationship, concurrently fail, the restoring unit 42 restores data recorded in the logical volume of the current storage units 31 and 32, or 33 and 34 on the basis of the mapping table 40, thereby restoring, on the spare storage units 35 and 36 which can establish the mirroring relationship, the logical volume. Accordingly, it is thereby possible to guarantee data recorded on a plurality of current storage units 31 through 34, and to immediately restore the logical volume without a maintenance operation such as replacement, repair or the like of the storage unit.

According to the information processing system of the embodiment of this invention, the hierarchy controlling unit 42 records data of the same virtual logical volume in the same logical volume as much as possible. Hence, even when a fault occurs in the current storage units 31 through 34, only one virtual logical volume is affected by this, and the damage can be suppressed to the minimum. When the restoring unit 42 reads out data from the recording medium 12 in the secondary storage devices 10 and 11, the data has to be read out from only one recording medium 12, which can largely shorten the restoration time as compared with a case where the data is read out from a plurality of recording media 12. This is helpful to immediately restore the logical volume.

[2] Others

Note that the prevent invention is not limited to the above examples, but may be modified in various ways without departing from the scope of this invention.

For example, the number of structural elements (particularly, the current storage units or the spare storage units) configuring the information processing system is not limited to the above example.

The functions of the above hierarchy controlling unit 41 and restoring unit 42 may be realized by executing a predetermined application program (logical volume restoring program) by a computer (including CPU, information processor, various terminals).

The program is provided in a form that the program is recorded on a computer readable recording medium such as a flexible disk, CD (CD-ROM, CD-R, CD-RW or the like), DVD (DVD-ROM, DVD-RAM, DVD-R, DVD-RW, DVD+R, DVD+RW or the like) or the like. In which case, the computer reads out, for example, the logical volume restoring program from the recording medium, transfers and stores the program in the internal storage device or an external storage device to use the same. Alternatively, the program may be recorded on a storage device (recording medium) such as a magnetic disk, optical disk, magneto-optical disk or the like, and provided from the storage device to the computer over a communication line.

Here, the computer is a concept including hardware and an OS (operating system), which signifies hardware operating under a control of the OS. When the OS is unnecessary and the application program alone operates the hardware, the hardware itself corresponds to the computer. The hardware comprises at least a microprocessor such as a CPU or the like, and a means for reading a computer program recorded on a recording medium. The application program as being the above logical volume restoring program includes program codes for making the computer realize the functions as being the hierarchy controlling unit 41 and the restoring unit 42. A part of the functions may be realized by not the application program but the OS.

As the recording medium according to the embodiment, usable is any one of various kinds of computer readable media such as an IC card, ROM cartridge, magnetic tape, punched card, internal storage device of the computer (memory such as ROM, RAM or the like), external storage device, printed matter on which codes such as bar codes or the like are printed, etc., along with the above flexible disk, CD, DVD, magnetic disk, optical disk, magneto-optical disk and the like.

What is claimed is:

1. An information processing system comprising:
    a secondary storage device for retaining a recording medium configuring a virtual logical volume;
    a data processing apparatus for processing data recorded in the virtual logical volume of said secondary storage device; and
    a primary storage device, of which access speed is higher than said recording medium retained in said secondary storage device and which is connected to said data processing apparatus; for reading out, in response to an access request from said data processing apparatus, from said secondary storage device and recording the data;
    said primary storage device comprising:
    at least two current storage units configuring a logical volume in which data read out from the virtual logical volume of said secondary storage device in order that said data processing apparatus has an access to the data to process the same is recorded, and being in a mirroring relationship;
    at least two spare storage units operable to be used in the mirroring relationship;
    a hierarchy controlling unit dumping data not accessed from said data processing apparatus to said recording medium configuring the virtual logical volume;
    a mapping table showing a relationship between data recorded in the logical volume of said current storage units and data recorded in the virtual logical volume of said recording medium; and
    a restoring unit for, when said at least two current storage units in the mirroring relationship concurrently fail, reading out data recorded in the logical volume of said current storage units from the virtual logical volume of said secondary storage device on the basis of the relationship held in said mapping table, recording the data on said at least two spare storage units, thereby restoring, on said at least two spare storage units, the logical volume of said at least two current storage units.

2. The information processing system according to claim 1, wherein said secondary storage device has a plurality of virtual logical volumes;
    said primary storage device has a plurality of logical volumes; and
    said hierarchy controlling unit records, over the plural logical volumes, data in the same virtual logical volume.

3. The information processing system according to claim 2, wherein, when data in the same virtual logical volume cannot be recorded on one logical volume because the logical volume lacks a capacity thereof, said hierarchy controlling unit records, on another logical volume differing from the logical volume, the data in the virtual logical volume.

4. The information processing system according to claim 3, wherein, in the case where data in the same virtual logical volume is recorded over a plurality of logical volumes, when a part of the data is read out from one logical volume among the plural logical volumes, so that the data in the same virtual logical volume gets to be able to be recorded on the one logical volume, said hierarchy controlling unit records, on the one logical volume, the data.

5. A primary storage device interposed between a secondary storage device retaining a recording medium configuring a virtual logical volume and a data processing apparatus processing data recorded in the virtual logical volume of said secondary storage device, said primary storage device comprising:
    at least two current storage units configuring a logical volume in which data read out from the virtual logical volume of said secondary storage device in order that said data processing apparatus has an access to the data to process the same is recorded, and being in a mirroring relationship;
at least two spare storage units which can be used in the mirroring relationship;
a hierarchy controlling unit dumping data not accessed from said data processing apparatus to said recording medium configuring the virtual logical volume;
a mapping table showing a relationship between data recorded in the logical volume of said current storage units and data recorded in the virtual logical volume of said recording medium; and
a restoring unit for, when said at least two current storage units concurrently fail, reading out data recorded in the logical volume of said current storage units from the virtual logical volume of said secondary storage device on the basis of the relationship held in said mapping table, recording the data on said at least two spare storage units, thereby restoring, on said at least two spare storage units, the logical volume of said at least two current storage units,
wherein the primary storage device, of which access speed is higher than said recording medium retained in said secondary storage device and which is connected to said data processing apparatus, for reading out, in response to an access request from said data processing apparatus, from said secondary storage device and recording data.

6. The primary storage device according to claim 5, wherein said primary storage device has a plurality of logical volumes; and
said hierarchy controlling unit records, over the plural logical volume, data in the same virtual logical volume among a plurality of logical volumes of said secondary storage device.

7. The primary storage device according to claim 6, wherein, when data in the same virtual logical volume cannot be recorded on one logical volume because the logical volume lacks a capacity thereof, said hierarchy controlling unit records, on another logical volume differing from the logical volume, the data in the virtual logical volume.

8. The primary storage device according to claim 7, wherein, in the case where data in the same virtual logical volume is recorded over a plurality of logical volumes, when a part of the data is read out from one logical volume among the plural logical volumes, so that the data in the same virtual logical volume gets to be able to be recorded on the one logical volume, said hierarchy controlling unit records, on the one logical volume, the data.

9. A computer readable recording medium recorded thereon a logical volume restoring program for making a computer realize a function of restoring a logical volume configured by at least two current storage units when said at least two current storage units concurrently fail in a primary storage device which is interposed between a secondary storage device retaining a recording medium configuring a virtual logical volume and a data processing apparatus processing data recorded in the virtual logical volume of said secondary storage device, configures the logical volume in which the data read out from the virtual logical volume of said secondary storage device in order that said data processing apparatus has an access to the data to process the same is recorded, and comprises said at least two current storage units being in a mirroring relationship and at least two spare storage units which can be used in the mirroring relationship, and said primary storage device, of which access speed is higher than said recording medium retained in said secondary storage and which is connected to said data processing apparatus, reading out, in response to an access request from said data processing apparatus, from said secondary storage device and recording the data;
said computer readable recording medium making said computer function as;
a hierarchy controlling unit dumping data not accessed from said data processing apparatus to said recording medium configuring the virtual logical volume; and
a restoring unit for, when said at least two current storage units concurrently fail, reading out data recorded in the logical volume of said current storage units from the virtual logical volume of said secondary storage device on the basis of the relationship held in a mapping table showing a relationship between data recorded in the logical volume of said current storage units and data recorded in the virtual logical volume of said recording medium, recording the data on said at least two spare storage units, thereby restoring, on said at least two spare storage units, the logical volume of said at least two current storage units.

10. The computer readable recording medium recorded thereon a logical volume restoring program according to claim 9, wherein said logical volume restoring program makes said computer function so that said restoring unit restores, on said spare storage units, the logical volume on the basis of a relationship held in the mapping table showing the relationship between data recorded in the logical volume of said current storage units and data recorded in the virtual logical volume of said recording medium.

11. The computer readable recording medium recorded thereon a logical volume restoring program according to claim 9, wherein said hierarchy controlling unit records, on each of a plurality of logical volumes of said primary storage device, data in the same virtual logical volume among a plurality of virtual logical volumes of said second storage device.

12. The computer readable recording medium recorded thereon a logical volume restoring program according to claim 11, wherein said logical volume restoring program makes said computer function so that, when data in the same virtual logical volume cannot be recorded on one logical volume because the logical volume lacks a capacity thereof, said hierarchy controlling unit records, on another logical volume differing from the logical volume, the data in the virtual logical volume.

13. The computer readable recording medium recorded thereon a logical volume restoring program according to claim 12, wherein, in the case where data in the same virtual logical volume is recorded over a plurality of logical volumes, when a part of the data is read out from one logical volume among the plural logical volumes, so that the data in the same virtual logical volume gets to be able to be recorded on the one logical volume, said restoring program makes said computer function so that said hierarchy controlling unit records, on the one logical volume, the data.

14. A primary storage device comprising:
at least two current storage units in a mirroring relationship;
at least two spare storage units which can be used in the mirroring relationship; and
a hierarchy controlling unit dumping data not accessed from a data processing apparatus to a recording medium configuring a virtual logical volume;
a mapping table showing a relationship between data recorded in a logical volume of said current storage units and data recorded in the virtual logical volume of said recording medium; and a restoring unit reading out data recorded in a logical volume of the current storage units from a virtual logical volume of a secondary storage device on the basis of the relationship held in said mapping table, wherein the restoring unit records the data on the at least two spare storage units when the at least two current storage units concurrently fail and the primary storage device, of which access speed is higher than said recording medium retained in said secondary storage device and which is connected to said data processing apparatus, for reading out, in response to an access request from said data processing apparatus, from said secondary storage device and recording the data.

* * * * *

UNITED STATES PATENT AND TRADEMARK OFFICE
CERTIFICATE OF CORRECTION

PATENT NO.       : 7,571,291 B2                               Page 1 of 1
APPLICATION NO.  : 11/126165
DATED            : August 4, 2009
INVENTOR(S)      : Koutarou Sasage et al.

It is certified that error appears in the above-identified patent and that said Letters Patent is hereby corrected as shown below:

Column 10, Line 7, change "apparatus;" to --apparatus,--.

Column 12, Line 5, change "as;" to --as:--.

Signed and Sealed this

Seventeenth Day of November, 2009

David J. Kappos
*Director of the United States Patent and Trademark Office*